United States Patent Office 3,026,348
Patented Mar. 20, 1962

3,026,348
PREPARATION OF TETRACYANOETHYLENE AND CHLOROTRICYANOETHYLENE FROM DICHLORODICYANOETHYLENE
Elmore L. Martin, Wilmington, Del., assignor to E. I. du Pont de Nemours and Company, Wilmington, Del., a corporation of Delaware
No Drawing. Filed Sept. 16, 1958, Ser. No. 761,291
2 Claims. (Cl. 260—465.8)

This invention is concerned with a new chemical process and more particularly with a new method for preparing tetracyanoethylene and chlorotricyanoethylene.

McKusick et al. (J. Am. Chem. Soc. 80, 2806 (1958)) and Sausen et al. (ibid, 2815) have shown that tetracyanoethylene is useful for reacting with a wide variety of compounds for the preparation of tricyanovinyl derivatives. Chlorotricyanoethylene is similarly useful in preparing tricyanovinyl derivatives. In some instances, chlorotricyanoethylene yields a slightly different derivative from that afforded by tetracyanoethylene.

There has now been discovered a process for the preparation of tetracyanoethylene, and particularly for the simultaneous preparation of tetracyanoethylene and chlorotricyanoethylene, which comprises reacting a dichlorodicyanoethylene with a metal cyanide. Further, in accordance with this invention it has been found that tricyanovinyl compounds can be directly prepared by the reaction of a dichlorodicyanoethylene with a metal cyanide in the presence of a compound capable of reacting with tetracyanoethylene or chlorotricyanoethylene.

In the process of the present invention, the three isomers of dichlorodicyanoethylene, i.e., dichlorofumaronitrile, dichloromaleonitrile, and 1,1-dichloro-2,2-dicyanoethylene (dichloromethylenemalononitrile), may be used interchangeably or in admixture with no substantial effect on the reaction rate or yield of products.

Metal cyanides as a class are operable in the present process. Metal cyanides are discussed in detail in "Cyanogen Compounds," by H. E. Williams, Edward Arnold & Company, London. Second edition, 1948, pages 98–234. Thus, there can be employed in accordance with this invention heavy metal cyanides, alkali metal cyanides and alkaline earth metal cyanides, for example, single metal cyanides such as $Ba(CN)_2$, $Cd(CN)_2$, $Ca(CN)_2$, $CsCN$, $Co(CN)_2$, $Co(CN)_3$, $Cu_2(CN)_2$, $Cu(CN)_2$, $AuCN$, $Au(CN)_3$, $In(CN)_3$, $Fe(CN)_2$, $LiCN$, $Pb(CN)_2$, $Hg(CN)_2$, $Mg(CN)_2$, $Mn(CN)_2$, $Ni(CN)_2$, $Pd(CN)_2$, $Pt(CN)_2$, $KCN$, $RbCN$, $AgCN$, $NaCN$, $Sr(CN)_2$, $TlCN$, and $Zn(CN)_2$, as well as the double metal cyanides and multiple metal cyanides such as $K_2Hg(CN)_4$, $Cd(CN)_2 \cdot CuCN$, $BaNi(CN)_4$, $Na_2Ca(CN)_4$, $K_3Cr(CN)_6$, $K_2ZnCo(CN)_6$, $Li_3Cr(CN)_6$, $K_4Fe(CN)_6$, $Na_3Fe(CN)_6$, $Na_2Pt(CN)_4$, $Ba_3[Co(CN)_6]_2$, $K_3Cu(CN)_4$, $K_3Mn(CN)_6$, $NaCu(CN)_2$, $NaAg(CN)_2$, and similar metal cyanides. Best yields are obtained with the preferred cyanides which include the single cyanides of the alkali metals and the double cyanides in which one of the metals is an alkali metal and the second metal is a heavy metal, i.e., one which in the free state has a density greater than 4.

The reaction of a dichlorodicyanoethylene with a metal cyanide to form tetracyanoethylene and chlorotricyanoethylene will take place slowly over an extended period of time by simply bringing the reactants into intimate contact at room temperature. More rapid reaction can be obtained by heating such a mixture at temperatures in excess of 60° C. to melt the dichlorodicyanoethylene. For the most practical reaction rates and yields of products, it is preferred to carry out the reaction in the presence of a liquid reaction medium which is inert to the reactants and products.

As liquid diluents for the practice of this invention there can be used dioxane, tetrahydrofuran, alcohols, N,N-dimethylformamide, N,N-diethylformamide, N-methylformanilide, N-methylformamide, formamide, N-methyl-N-ethylacetamide, N,N-dimethylacetamide, N,N-diethylacetamide, tetramethylurea, tetraethylurea, pyridine, dimethylsulfoxide, and mixtures of these liquids with each other or with water or with water-miscible organic solvents. The dialkyl lower alkanoamides are the preferred class of solvents.

Temperature is not a critical factor in the present process, and temperatures from 0° C. and below up to the decomposition temperature of the reactants and products may be employed. However, for maximum yields, it is preferred to operate in the range of 0–200° C., and particularly in the range of 25–95° C. Pressure is not a critical factor in the process, and pressures above and below atmospheric pressure may be employed. For convenience, atmospheric pressure is preferred.

The molar proportions of dichlorodicyanoethylene to metal cyanide employed in this process may be varied widely, i.e., from 1:19 to 19:1. However, best yields are obtained when there is at least a slight molar excess of metal cyanide, and a molar ratio of 1:>1 is therefore preferred.

Water is not a critical component of the present process. However, when water is present, it has been found that yields are somewhat improved if the pH of the reacting mass is maintained within the range of 4.5 to 8 and it is preferred to operate in the pH range of 6.0 to 7.0.

Tetracyanoethylene can be isolated in the process of this invention by reacting it with an aqueous sulfite solution, as shown in Middleton U.S. 2,809,972, to convert it to the corresponding 1,1,2,2-tetracyanoethanesulfonic acid or salt. Tetracyanoethylene is then regenerated by oxidation, such as by the action of nitric acid, bromine, or similar oxidants. Any oxidizing agent capable of oxidizing sulfite to sulfate will serve in this oxidation step. Under these conditions tetracyanoethylene separates as a precipitate from the aqueous phase and may be recovered by filtration. It may be purified by known means, such as by recrystallization or sublimation or by repeating the conversion to 1,1,2,2-tetracyanoethanesulfonate and oxidizing to recover tetracyanoethylene.

Among the compounds which can be present during a practice of the process of this invention and which yield tricyanovinyl derivatives directly when so treated, there are included the following:

(1) Primary aromatic amines in which neither of the annular carbons immediately adjacent to the carbon bonded to the amino substituent is directly bonded to hydrogen or halogen and in which hydrogen is bonded to the annular carbon in the 4-position, the carbon bonded to the amino group being considered in the 1-position.

(2) Secondary and tertiary aromatic amines in which hydrogen is bonded to the annular carbon in the 4-position.

(3) Heterocyclic amines in which the ring is resonance stabilized and contains at least one carbon bonded to hydrogen and in which only two bonds of the nitrogen are attached to the ring.

Items 1–3 are from Heckert U.S. 2,762,810 and yield C-tricyanovinylamines on reaction with tetracyanoethylene.

(4) Primary and secondary aliphatic and cycloaliphatic amines and aralkylamines.

(5) Primary aromatic amines in which at least one ring carbon immediately adjacent to the carbon attached to the amino group is directly attached to hydrogen or halogen.

(6) Primary aromatic amines having no hydrogen directly attached to ring carbons in the 2-, 4-, and 6-positions, considering the carbon attached to the amino group as being in the 1-position.

(7) Secondary aromatic amines having no hydrogen attached to the ring carbon in the 4-position.

(8) Heterocyclic secondary amines in which the ring is resonance stabilized and contains no ring carbon directly attached to hydrogen and in which only two bonds of the nitrogen are attached to the ring.

Items 4–8 are from Heckert U.S. 2,762,832 and yield N-tricyanovinylamines on reaction with tetracyanoethylene.

(9) Phenols containing at least one hydrogen bonded to annular carbon at a position other than meta in the phenol ring (Heckert U.S. 2,762,833).

(10) Azomethines of the type R—CH=N—X where R is a member of the class consisting of hydrogen, alkyl, cycloalkyl, aralkyl, aryl (including substituted aryl), and dialkylamino, and X is of the class consisting of hydroxy, alkoxy, aralkoxy, aryl, and amino. Particularly preferred compounds of this class are those in which R is alkyl, cycloalkyl, aralkyl, or aryl (including substituted aryl), and X is aryl or amino.

It will be understood that the term "amino" includes the recognized substituted amino groups such as alkylamino, arylamino (i.e., anilino), dialkylamino, N-alkyl-N-arylamino, ureido, thioureido, and guanidino.

(11) Azomethines of the types:

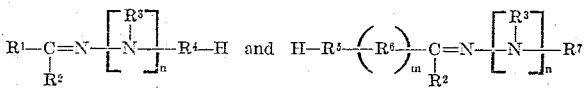

where n and m are the same or different and represent a cardinal number no greater than 1, i.e., zero or one; $R^1$ and $R^3$ are the same or different and represent a member of the group consisting of hydrogen and hydrocarbyl radicals (i.e., alkyl, cycloalkyl, aralkyl, or aryl hydrocarbon); $R^2$ is of the group consisting of hydrogen, alkyl, cycloalkyl, aralkyl, and aryl; $R^4$ is 1,4-arylene; $R^5$ is a member of the group consisting of 2,5-furylene and 2,5-pyrrylene; $R^6$ is vinylene; and $R^7$ is a member of the group consisting of aryl, hydroxy, alkoxy, carbamyl, thiocarbamyl, and amidino.

The aryl moieties in $R^2$, $R^4$, and $R^7$ include carbocyclic aryl such as phenyl, naphthyl, and anthryl, and heterocyclic aryl such as thienyl, pyrryl, indolyl, furyl, oxazolyl, pyridyl, and quinolyl and substituted derivatives of these groups.

(12) 1-acyl-2-arylhydrazines in which the aryl moiety has a hydrogen in the 4-position.

(13) Vinyl amines such as Fischer's base (2-methylene-1,3,3-trimethylindoline).

(14) Aminoarylolefins such as 1,1-bis(p-dimethylaminophenyl)-ethylene.

The following compounds are representative of those which when present during the process of this invention yield tricyanovinyl derivatives directly by reaction with tetracyanoethylene or chlorotricyanoethylene:

N-methylaniline
N,N-dimethyliline
N-methyl-N-(β-cyanoethyl)aniline
Diphenylamine
N-phenylethanolamine
N-(β-cyanoethyl)-o-toluidine
N-methyl pyrrole
Tetrahydroquinoline
N-phenylglycine
N-phenylanthranilic acid
N-phenylmorpholine
N-ethyl-N-β-chloroethylaniline
N-β-cyanoethyl-N-β-benzyloxyethylaniline
N-n-hexyldiphenylamine
Julolidine
Bis-β-(N-methylanilino)ethyl terephthalate
Indole
n-Butylamine
Stearylamine
Benzylamine
Cyclohexylamine
Aniline
p-Chloroaniline
Methyl p-aminobenzoate
m-Nitroaniline
α-Naphthylamine
Piperidine
p-Phenylenediamine
2,6-dimethylphenol
p-Cresol
p-Methoxyphenyl(p-methoxyphenylmethylene)amine
p-Chlorobenzaldehyde oxime
p-Dimethylaminobenzaldehyde p-nitrophenylhydrazone
2-(p-Dimethylaminobenzalamino)-3,4-dicyano-5-benzyl-thiopyrrole
p-Dimethylaminobenzaldehyde thiosemicarbazone
2,5-bis(dimethylaminomethyleneamino)-3,4-dicyano-thiophene
3-indoleacetaldehyde semicarbazone
3-pyridinecarboxaldehyde oxime
Glucose 2,4-dinitrophenylhydrazone
1-p-nitroanilino-2-(1,3,3-trimethyl-2-indolylidenemethyl)-azomethine
Texahydrobenzaldehyde oxime
4-methoxybenzaldehyde-3-sulfonic acid p-nitrophenylhydrazone
Quinoline-2-carboxaldehyde 2,4-dinitrophenylhydrazone
Isoxazole-3-carboxaldehyde p-nitrophenylhydrazone
Trifluoroacetaldehyde p-chlorophenylhydrazone
Benzaldehyde phenylhydrazone
Acetophenone phenylhydrazone
Benzophenone anil
Cinnamaldehyde phenylhydrazone
Piperonal phenylhydrazone
Veratraldehyde phenylhydrazone
Furfural phenylhydrazone
α-thenaldehyde phenylhdrazone
Glyoxalphenylosazone
1-formyl-2-phenylhydrazine
1-benzoyl-2-phenylhydrazine
1-(4-toluenesulfonyl)-2-phenylhydrazine
1-stearoyl-2-phenylhydrazine
1-methacryloyl-2-(2-benzylphenyl)hydrazine In the following examples parts are by weight unless otherwise specified. Example VIII represents a preferred embodiment of the invention.

*Example I*

To a solution of 10 parts of the mixed 1,2-dichloro-1,2-dicyanoethylenes (Eldred and Young, J. Am. Chem. Soc. 75, 4338 (1953)) in 283 parts of dimethylformamide there is added about 5 parts of finely powdered sodium cyanide. The resulting reaction mixture is warmed slightly and to the resulting brownish-yellow solution is added about 5 parts of N,N-dimethylaniline. The reaction mixture immediately takes on the magenta color characteristic of the dye N,N-dimethyl-4-tricyanovinylaniline obtained from tetracyanoethylene and N,N-dimethylaniline. Similar results are obtained by adding sodium cyanide to a warm solution of the mixed 1,2-dichloro-1,2-dicyanoethylenes and N,N-dimethylaniline in dimethylformamide.

*Example II*

A solution of 294 parts of dichlorofumaronitrile and 460 parts of N,N-dimethylaniline in 945 parts of dimethylformamide is cooled in ice and 100 parts of finely powdered sodium cyanide is added gradually in small portions with stirring. After stirring for 15 minutes at 5° C., the reaction mixture is diluted with cold water and filtered. The precipitate is washed first with water and then with petroleum ether. The resulting solid is dissolved in methylene chloride and the resulting solution is dried with anhydrous magnesium sulfate. The methylene chloride solution is evaporated to a small volume, anhydrous ether is added and the evaporation is repeated whereupon 10 parts of violet crystals of N,N-dimethyl-4-tricyanovinylaniline is obtained. The compound melts at 173–175° C. and the mixed melting point with a known sample of N,N-dimethyl-4-tricyanovinylaniline (McKusick et al., J. Am. Chem. Soc. 80, 2806 (1958)) is 173–175° C.

*Example III*

A solution of 150 parts of sodium cyanide, 271 parts of mercuric chloride and 250 parts of N,N-dimethylaniline in 1890 parts of dimethylformamide is stirred at 85° C. for several minutes followed by the addition of 147 parts of dichlorofumaronitrile. The reaction mixture turns a magenta color almost immediately and an additional quantity of 50 parts of finely powdered sodium cyanide is added in small portions during the course of 30 minutes. After stirring for an additional period of two hours at 85° C., the resulting deep magenta solution is poured into a mixture of ice and water. The precipitate is collected and washed first with cold water and then with petroleum ether to remove traces of N,N-dimethylaniline. The yield of N,N-dimethyl-4-tricyanovinylaniline is 110 parts which represents a yield of 49% of the theoretical amount based on the dichlorofumaronitrile.

*Example IV*

A mixture of 100 parts of sodium cyanide, 266 parts of silver cyanide, and 1890 parts of dimethylformamide is stirred mechanically on a steam bath until a homogeneous solution is obtained. After cooling slightly, 120 parts of N,N-dimethylaniline and 147 parts of dichlorofumaronitrile is added and the resulting mixture is heated on a steam bath with mechanical stirring for 2.5 hours. The reaction mixture is poured onto ice and water and the N,N-dimethyl-4-tricyanovinylaniline is isolated in 51% yield as described in Example III.

*Example V*

A mixture of 270 parts of silver cyanide, 100 parts of sodium cyanide and 2200 parts of dimethylsulfoxide is stirred at 95° C. until a homogeneous solution is obtained. After cooling slightly, 147 parts of dichlorofumaronitrile and 150 parts of N,N-dimethylaniline are added and the resulting solution is stirred at 95° C. for 2.5 hours. The N,N-dimethyl-4-tricyanovinylaniline is isolated from the reaction mixture in 53% yield essentially as described in Example III.

*Example VI*

To a mechanically stirred solution of 294 parts of dichlorofumaronitrile in 1190 parts of methanol cooled in an ice-water bath there is added a solution of 210 parts of sodium bisulfite in 500 parts of water. To the resulting reaction mixture there is added a solution of 200 parts of sodium cyanide in 1000 parts of water at such a rate that the pH of the reaction medium is maintained at 7–8. The time required to add the sodium cyanide solution is about 2 hours. The resulting brown solution is concentrated to about 1500 parts under reduced pressure in a bath at 40–50° C. The resulting aqueous solution of sodium 1,1,2,2-tetracyanoethanesulfonate is cooled to 25° C. and 710 parts of cold, concentrated nitric acid is added dropwise. An exothermic reaction occurs and a precipitate of tetracyanoethylene forms. The crude tetracyanoethylene is collected by filtration, washed with water, air-dried and then sublimed at 0.3 mm. pressure from a bath at 130–140° C. The resulting colorless crystals weigh 20 parts and melt at 197–199° C. alone or in admixture with a known sample of tetracyanoethylene.

The compound gives π complexes with benzene (yellow), xylene (red), anisole (burgundy), anthracene (transient dark green solution from which white crystals of the Diels-Alder adduct from anthracene and tetracyanoethylene separate), and N,N-dimethylaniline (blue changing to magenta with the formation of N,N-dimethyl-4-tricyanovinylaniline) in agreement with those listed for known tetracyanoethylene. The infrared spectrum contains a divided band in the nitrile region characteristic of conjugately unsaturated nitriles and is identical with the infrared spectrum of tetracyanoethylene prepared as described by Cairns et al., J. Am. Chem. Soc. 80, 2775 (1958).

*Example VII*

To a mechanically stirred solution of 59 parts of dichlorofumaronitrile in 155 parts of dioxane containing about one part of 85% phosphoric acid there is added a solution of 42 parts of sodium bisulfite in 100 parts of water. To the above reaction mixture at 40–45° C. there is added during the course of 30 minutes a solution of 50 parts of sodium cyanide and 2 parts of cuprous chloride in 150 parts of water at such a rate as to maintain the pH of the reaction mixture at 6.2±0.1. The resulting brown solution is concentrated to about 200 parts under reduced pressure at 40–60° C. and cooled to 25° C. Concentrated nitric acid (71 parts) is added slowly. The crude tetracyanoethylene which separates is collected, washed with cold water, and after air-drying is sublimed at 0.25 mm. pressure from a bath at 130–140° C. The yield of colorless tetracyanoethylene melting at 197–199° C. is 15 parts, or 30% of the theoretical amount.

*Example VIII*

To a solution of 45 parts of sodium bisulfite in a mixture of 100 parts of water and 79 parts of methanol at 25° C. there is added part of a solution of 60 parts of sodium cyanide and 4 parts of cuprous chloride in 200 parts of water until the pH of the reaction mixture is 6. A solution of 59 parts of dichlorofumaronitrile in 159 parts of methanol and the remainder of the sodium cyanide-cuprous chloride solution are added separately at approximately equivalent rates so as to maintain the pH at 6.0±0.1, the temperature being gradually increased to 40° C. The resulting dark brown solution of sodium 1,1,2,2-tetracyanoethanesulfonate is concentrated under reduced pressure to about 250 parts. This is cooled to 25° C. and 71 parts of concentrated nitric acid is added slowly. The crude tetracyanoethylene which separates is collected, washed with cold water, air-dried, and purified by sublimation at 0.25 mm. pressure from a bath at 130–150° C. The yield of colorless tetracyanoethylene is 18 parts, or 35% of the theoretical amount.

*Example IX*

To a solution of 45 parts of sodium bisulfite, 100 parts of water, and 79 parts of methanol there is added 42 parts of hydrogen cyanide. To the resulting mechanically stirred solution at 40° C. there is added a solution of 60 parts of sodium cyanide and 4 parts of cuprous chloride in 250 parts of water and a solution of 59 parts of dichlorofumaronitrile in 198 parts of methanol at approximately equivalent rates, the pH being maintained at 6.5 by controlling the rate of addition of the cyanide and nitrile solutions. After concentrating the reaction mixture under reduced pressure to about 250 parts, 71 parts of concentrated nitric acid is added slowly to it. Upon cooling in ice, the crude tetracyanoethylene separates. It is then collected, washed with water, and air-dried. Sublimation of the crude material (19 parts) at 0.25 mm. pressure from a bath at 130–150° C. gives 12 parts of colorless tetracyanoethylene.

Example X

A mixture of 30 parts of sodium cyanide, 80 parts of silver cyanide, and 236 parts of dimethylformamide is stirred at 70-80° C. until a homogeneous solution is obtained. After the mixture cools slightly, 60 parts of N-methylaniline and 44 parts of dichlorofumaronitrile are added. The resulting mixture is heated at 70-80° C. with stirring for two hours. The product is poured into a mixture of ice water and petroleum ether. The mixture is filtered and the semi-solid precipitate is washed with petroleum ether. The filter cake is then extracted with diethyl ether. The orange extract is freed of moisture, concentrated to a small volume, and diluted with an equal volume of petroleum ether. The orange solid which precipitates is collected by filtration and recrystallized twice from diethyl ethyl to yield yellow crystals of N-methyl-N-tricyanovinylaniline melting at 124-126° C. both alone and in admixture with an authentic sample of N-methyl-N-tricyanovinylaniline. The infrared spectrum of the product is identical with that of an authentic sample of N-methyl-N-tricyanovinylaniline.

Example X shows the presence of chlorotricyanoethylene in the reaction product of the present invention. If tetracyanoethylene had been the sole product, the dye isolated from reaction with N-methylaniline would have been N-methyl-p-tricyanovinylaniline as shown in Heckert U.S. 2,762,810, Example I. This dye gives burgundy-colored solutions and red dyeings. N-methyl-p-tricyanovinylaniline melts at 178-179° C. (McKusick et al., J. Am. Chem. Soc. 80, 2810 (1958).)

Chlorotricyanoethylene reacts with N-methylaniline to yield N-methyl-N-tricyanovinylaniline which melts at 124-126° C. This dye gives orange solutions and yellow dyeings. These properties confirm that this is the product isolated in Example X.

Example XI

To a mechanically stirred solution of 21 parts of sodium bisulfite in 100 parts of water and 50 parts of dioxane at 25° C. there is added slowly a solution of 30 parts of sodium cyanide and one part of cuprous chloride in 70 parts of water and a solution of 29 parts of 1,1-dichloro-2,2-dicyanoethylene in 70 parts of dioxane. The additions are made over a period of about 10 minutes and the pH is maintained at 6.5±0.2 by controlling the rate of addition of the cyanide solution. The resulting solution is concentrated under reduced pressure at 45-50° C. to about 200 parts. Concentrated nitric acid, 78 parts, is added slowly. An exothermic reaction occurs and the tetracyanoethylene which precipitates is collected by filtration, washed with water, and air-dried. The light gray crude product is purified by sublimation at 0.25 mm. pressure using a bath temperature of 130-150° C. Colorless tetracyanoethylene is obtained which melts at 197-199° C. either alone or in admixture with an authentic sample.

The colorless crystals form colored $\pi$ complexes with benzene (yellow), xylene (red), anisole (burgundy), anthracene (dark green solution in benzene from which white crystals of the Diels-Alder adduct separate), and N,N-dimethylaniline (blue changing to magenta with the formation of N,N-dimethyl-4-tricyanovinylaniline). The infrared spectrum of the product has a divided band in the nitrile region characteristic of conjugated unsaturated nitriles and is identical with the spectrum of an authentic sample of tetracyanoethylene.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In a process of preparing tetracyanoethylene, the step of reacting dichlorodicyanoethylene with a metal cyanide selected from the group consisting of heavy metal cyanides, alkali metal cyanides and alkaline earth metal cyanides in the presence of an aqueous sulfite solution at a temperature of 0-200° C. while maintaining a pH of 4.5 to 8, the molar ratio of dichlorodicyanoethylene to metal cyanide being in the range of 1:19 to 19:1.

2. In a process of preparing tetracyanoethylene, the steps of (1) reacting dichlorodicyanoethylene with a metal cyanide selected from the group consisting of heavy metal cyanides, alkali metal cyanides and alkaline earth metal cyanides in the presence of an aqueous sulfite solution at a temperature of 0 to 200° C. while maintaining a pH of 4.5 to 8, the molar ratio of dichlorodicyanoethylene to metal cyanide being in the range of 1:19 to 19:1, to form an aqueous solution of the 1,1,2,2-tetracyanoethanesulfonate of said metal and (2) precipitating tetracyanoethylene by adding an oxidizing agent to said aqueous solution of sulfonate.

References Cited in the file of this patent

UNITED STATES PATENTS

| | | |
|---|---|---|
| 2,471,767 | Mowry et al. | May 31, 1949 |
| 2,762,810 | Heckert | Sept. 11, 1956 |
| 2,762,832 | Heckert | Sept. 11, 1956 |
| 2,809,972 | Middleton | Oct. 15, 1957 |

FOREIGN PATENTS

| | | |
|---|---|---|
| 757,773 | Great Britain | Sept. 26, 1956 |